(12) United States Patent
Parker et al.

(10) Patent No.: US 6,285,447 B1
(45) Date of Patent: Sep. 4, 2001

(54) METHOD FOR INCREASING THE SIGNAL-TO-NOISE RATIO IN NON-DESTRUCTIVE TESTING

(75) Inventors: Steve Carl Jamieson Parker; Phillip Langley Salter, both of Bristol (GB)

(73) Assignee: BAE Systems, PLC, Hants (GB)

( * ) Notice: Subject to any disclaimer, the term of this patent is extended or adjusted under 35 U.S.C. 154(b) by 0 days.

(21) Appl. No.: 09/455,494

(22) Filed: Dec. 6, 1999

(30) Foreign Application Priority Data

Dec. 5, 1998 (GB) .................................................. 9826751

(51) Int. Cl.$^7$ ...................................................... G01B 9/02
(52) U.S. Cl. ........................................... 356/35.5; 356/450
(58) Field of Search .................................. 356/35.5, 450, 356/511, 516

(56) References Cited

U.S. PATENT DOCUMENTS

| 6,043,870 | * | 3/2000 | Chen | 356/35.5 |
| 6,097,477 | * | 8/2000 | Khoee | 356/35.5 |

FOREIGN PATENT DOCUMENTS

| 0875744A2 | 4/1998 | (EP) . |
| WO 90/07751 | 12/1990 | (GB) . |

OTHER PUBLICATIONS

Sjoedahl M. et al.: "Three Dimensional Deformation Field Measurements with simultaneous TV Holography and Electronic Speckle Photography", Applied Optics, US, Optical Society of America, Washington, vol. 36, No. 16, Jun. 1, 1997 (1997–06–01), pp. 3645–3648, XP000657622, ISSN: 0003–6935, p. 2, left–hand col, last line; right–hand col., In. 1, p. 3, left–hand col.

Liu–Sheng Wang et al.; "Additive–Subtractive Speckle Interferometry: Extractio of phase Data in Noisy Environments", Optical Engineering, US, Soc. Of Photo–Optical Instrumentation Engineers. Bellingham, vol. 35, No. 3, Mar. 1, 1996 (1996–03–01), pp 794–801, XP000597470, ISSN: 0091–3286.

Nakadate S et al.: "Fringe Scanning Speckle–Pattern Interferometry", Applied Optics, Jul. 15, 1985, USA, vol. 24, No. 14, pp 2172–2180, XP000885048, ISSN: 0003–6935.

* cited by examiner

Primary Examiner—Robert H. Kim
Assistant Examiner—Andrew H. Lee
(74) Attorney, Agent, or Firm—Kenyon & Kenyon

(57) ABSTRACT

The signal to noise ratio in non-destructive testing or evaluation of a sample (1) by in phase stepped optical inspection systems such as the optical shearography system using a shearing interferometer involves production of correlated speckle images successively stepped in phase by illuminating with coherent radiation a sample in an unstressed state, illuminating the sample with coherent radiation, stressing it incrementally at predetermined stress increments, and generating and capturing correlated speckle images successively stepped in phase of the incrementally stressed sample at the predetermined stress increments, using the phase stepped speckle images of the unstressed and incrementally stressed sample to calculate the phase before and after stressing and differencing the images to extract the incremental phase change, inspecting the magnitude and sign of each incremental phase change and if the phase difference between successive measurements increases by more than π subtracting 2 π from the measurement value or if the phase difference between successive measurements decreases by more than π adding 2 π to the measurement value, and calculating the phase at each point in each speckle image by summing the nearest neighbour phase differences in the image that are weighted by the square of their respective modulations, where the modulation is a measure of intensity variation with phase variation and normalising the result of this calculation by dividing by the sum of the modulations.

7 Claims, 1 Drawing Sheet

METHOD FOR INCREASING THE SIGNAL-TO-NOISE RATIO IN NON-DESTRUCTIVE TESTING

BACKGROUND OF THE INVENTION

Figure 1:
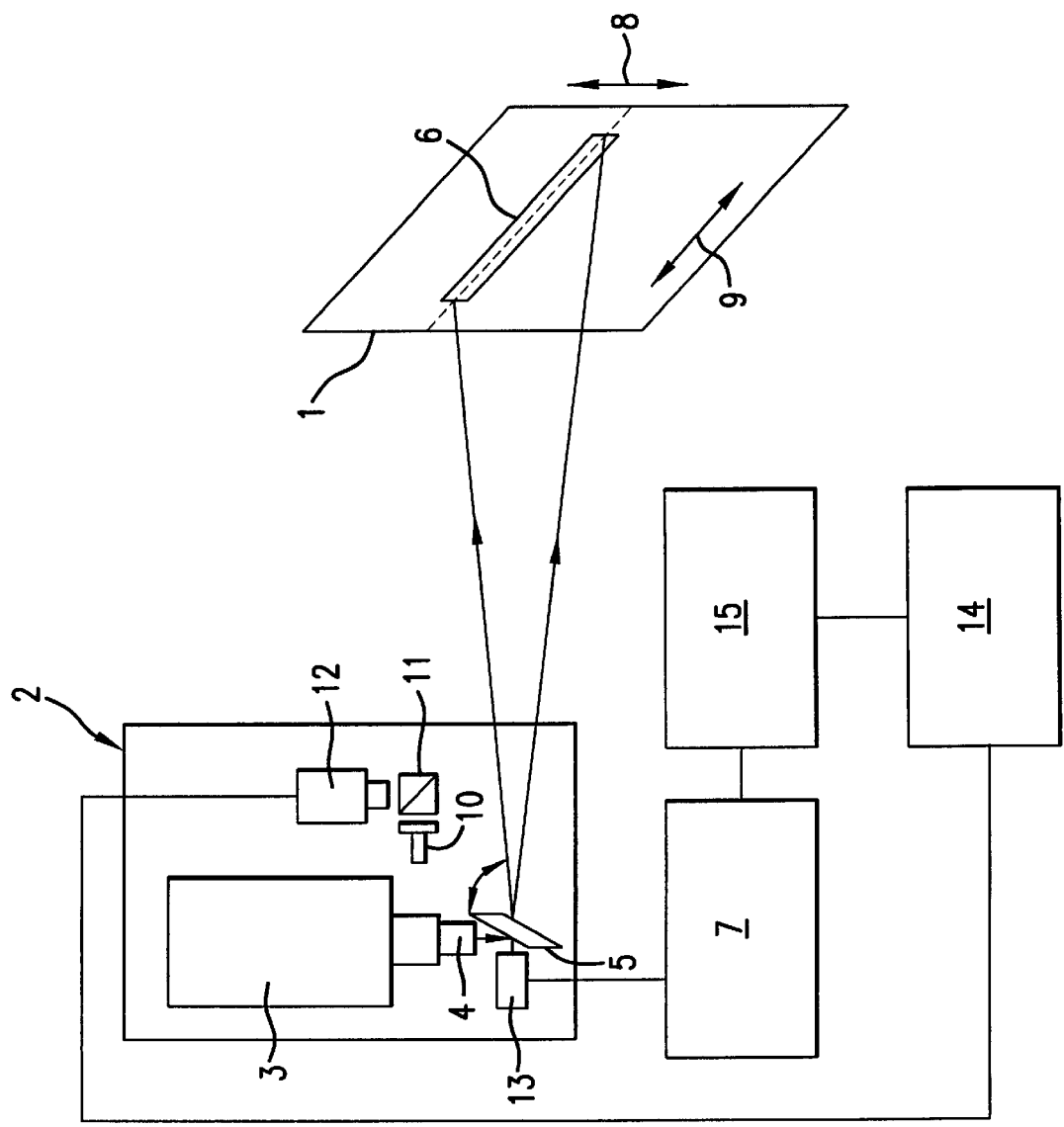

This invention relates to a method for increasing the signal-to-noise ratio in non-destructive testing of a sample by a phase-stepped optical inspection system which, particularly, but not exclusively, is suitable for use with optical shearography employing a shearing interferometer.

A particular type of phase-stepped optical inspection system for non-destructive testing or evaluation of a sample is an optical shearography system using a shearing interferometer.

Such contemporary shearography systems measure the surface form of an object in a static position and after it has been subjected to a stressing force. Usually, the stress is administered by a pressure reduction chamber or by thermal loading. The two images that characterize the unstressed and stressed states are subsequently subtracted to yield an image that contours the stress-induced distortion. If the stressing force has been applied effectively, then sub-surface defects in the test object, such as disbonding between the skin and core materials of a composite panel, may be visualized in this image.

Unfortunately, there are several factors that limit the effectiveness of shearography for non-destructive testing (NDT) namely:

1. Shearography is based on speckle interferometry, which is inherently noisy.
2. If the stressing force is applied gradually over an extended period, then the initial and final images may become de-correlated, due to environmental instability, and no result is produced.
3. The dynamic range of shearography is restricted, because of the limited spatial resolution of video based image acquisition.
4. Transient features, such as air currents, can mask the presence of defects.

A conventional technique known as phase stepping helps reduce image noise by eliminating stationary intensity patterns and enhancing image contrast. However, even if phase stepping is employed, the results are often too noisy and not sufficiently repeatable to be dependable for non-destructive testing or evaluation of safety critical structures.

There is thus a need for an improved method whereby the noise of shearography images is reduced and the repeatability of results is improved to an extent where shearography becomes viable for production non-destructive testing.

SUMMARY OF THE INVENTION

According to one aspect of the present invention, there is provided a method for increasing the signal-to-noise ratio in non-destructive testing of a sample by a phase-stepped optical inspection system in which, correlated speckle images successively stepped in phase are generated and captured of a sample to be tested or evaluated, by illuminating the sample, while in a static unstressed state, with coherent radiation, the sample is illuminated with coherent radiation, stressed incrementally at predetermined stress increments, and correlated speckle images successively stepped in phase are generated of the incrementally stressed sample at the predetermined stress increments and captured, the phase-stepped speckle images of the unstressed sample and the phase-stepped speckle images of the incrementally stressed sample are used to calculate the phase before and after stressing and differenced to extract the incremental phase change, the magnitude and sign of each incremental phase change is inspected, and if the phase difference between successive measurements increases by more than $\pi$, $2\pi$ subtracted from the measurement values, or if the phase difference between successive measurements decreases by more than $\pi$, $2\pi$ is added to the measurement value and the phase at each point in each speckle image is calculated with improved accuracy by summing the nearest neighbor phase differences in the image that are weighted by the square of their respective modulations, where the modulation is a measure of intensity variation with phase variation and the result of this calculation is normalized by dividing by the sum of the modulations.

Preferably, the predetermined stress intervals employed are dependent on the material and structure of the sample.

Conveniently, the phase differences are summed using a modulation filter in the form of a 3×3 convolution mask.

Advantageously, the optical inspection system utilized is an optical shearography system incorporating a shearing interferometer, and the modulation is a measure of intensity variation with phase variation in the shearing interferometer.

DETAILED DESCRIPTION

For a better understanding of the present invention and to show how the same may be carried into effect, reference will now be made, by way of example, to the accompanying single figure drawing, FIG. 1, which illustrates diagramatically a phase-stepped optical inspection system in the form of a shearography system for utilizing a method according to the present invention for increasing the signal-to-noise ratio in non-destructive testing or evaluation of a sample employing the system.

The method of the present invention is intended to increase the signal-to-noise ratio in non-destructive testing of a sample 1, conveniently an aircraft skin panel as illustrated in FIG. 1 of the accompanying drawings, by a phase-stepped optical inspection system which conveniently is an optical shearography system using a shearing interferometer 2 as shown in FIG. 1. While the method of the present invention can be employed for reducing noise in many coherent optical inspection systems, it will be described, for the sake of convenience, as utilized for improving the performance of a shearography system. Such a phase-stepped optical shearography system utilizes a laser 3 for providing a beam of coherent radiation for illuminating the sample 1. Conveniently, the beam is produced via a line generator 4 and fed to a movable scanning mirror 5 from which the laser radiation is produced as a stripe 6 on the sample 1. The scanning mirror 5 is movable by means of a mirror driver amplifier 7 to scan in the direction 8 on the sample 1 and to move in the direction 9 on the sample 1 which is the direction of shear. The speckle pattern generated is observed by a piezo electric transducer 10, an interferometer 11 and a charge-coupled device video camera 12. The laser 3, line generator 4, scanning mirror 5, transducer 10, interferometer 11, camera 12 and mirror drive 13 together make up the shearing interferometer 2. The video signal from the camera 12 is passed to a frame synchronizing unit 14 and from thence to a triggered signal generator 15 and back via the mirror drive amplifier 7 and mirror drive 13 to control movement of the scanning mirror 5.

To improve the reliability of shearography systems, and reduce the noise floor, more statistically independent speckle data must be captured. Pressure stressing of the sample provides an ideal opportunity to capture this data, because the stressing force is highly controllable and is applied over an extended period. In principle it should be possible to integrate a series of incremental phase differences to yield the total phase difference, while incorporating more data and improving the signal-to-noise-ratio (SNR). However, to use this additional data effectively, it has to be integrated in a coherent fashion so signatures from defects add constructively. There are two problems that prevent constructive integration of the data:

1. After phase information has been extracted from phase stepping of speckle images, the data is retrieved in a "wrapped" format due to the use of an inverse tangent operation in the calculation. This means that the phase values are only known to module $2\pi$ (e.g., 7.5 is indistinguishable from 5.5 $\pi$).
2. When the incremental phase differences are integrated, the intermediate phase terms cancel leaving only the difference between the first and last terms; consequently, the inherent SNR is not improved. This is illustrated more clearly by inspection of the following summation (equation 1) of component phase differences that is calculated over all of the images captured during the stressing process:

$$\phi = \sum_{i=0}^{n} [\varphi_i - \varphi_{i+1}] \quad (1)$$

Where, $\Phi$—total phase change over the duration of the stressing process $\phi_i$—phase calculated from the ith sample When this expression is expanded (equation 2), it is clear that the intermediate terms all cancel:

$$\Phi = (\phi_n - \phi_{n-1}) + (\phi_{n-1} - \phi_{n-2}) + \ldots (\phi_1 - \phi_0) \quad (2)$$

For effective data integration it is essential that the phase information is "unwrapped" prior to integration, otherwise large errors will be introduced and the final image will appear seriously fragmented. In practice, this is achieved by inspecting the magnitude and sign of each phase difference. If the phase increases or decreases by more than $\pi$ between successive measurements, then a wrapping transition is deemed to have occurred and it is subsequently corrected (2 $\pi$ is added if the phase difference is sharply negative and 2 $\pi$ is subtracted if it is sharply positive).

Thus, in the method of the present invention, correlated speckle images successively stepped in phase are generated and captured using the system of FIG. 1 for the sample 1 by illuminating the sample 1 while in a static unstressed state with coherent radiation from the laser 3. The sample 1 is then illuminated with coherent radiation from the laser 3, stressed incrementally at predetermined stress increments, and correlated speckle images successively stepped in phase are generated of the incrementally stressed sample at the predetermined stress increments and captured. The sample 1 is stressed in any convenient manner such as by means of thermal loading or by a pressure reduction chamber. The phase-stepped speckle images of the unstressed sample and the phase-stepped speckle images of the incrementally stressed sample are used to calculate the phase before and after stressing and differenced to extract the incremental phase change. Subsequently, the magnitude and sign of each incremental phase change is inspected and if the phase difference between successive measurements increases by more than $\pi$, $2\pi$ is subtracted from the measurement value or if the phase difference between successive measurements decreases by more than $\pi$, $2\pi$ is added to the measurement value.

The phase at each point in each speckle image is then calculated with improved accuracy by summing the nearest neighbor phase differences in the image that are weighted by the square of their respective modulations where the modulation is a measure of intensity variation with phase variation, and the result of this calculation is normalized by dividing by the sum of the modulations. In the shearing system of FIG. 1, the modulation is a measure of intensity variation with phase variation in the shearing interferometer 11.

In effect, to integrate the phase data, so that the intermediate terms do not cancel, it is necessary to decorrelate the speckle fields for each successive phase calculation. In practice, this is achieved by using regional information around each pixel to yield an improved estimate of the phase $\phi'$ at each point in the image. A modulation filter, conveniently implemented as a 3×3 convolution mask, is used to calculate the improved phase estimate. The modulation filter works by calculating a sum of nearest neighbor phase differences $\phi_I$ that are weighted by the square of their respective modulations $M_1^2$, where the summation is over all of the mask elements i (equation 3).

$$\phi' = \Sigma(\phi_i M_i^2)/\Sigma M_i^2 \quad (3)$$

The modulation $M_i$ is a measure of how much the intensity of pixel i varies as the phase of one of the channels in the shearing interferometer is varied. Modulation is a reliable measure of the "performance" of each pixel and high values indicate that the phase estimate will probably by more accurate than lower values. The practical definition of $M_i$ is given by equation 4:

$$M_i = \sqrt{\{2[I_2 - I_4][2I_3 - I_1 - I_5]\}} \quad (4)$$

Where $I_1$ to $I_5$ denote the intensities of the individual speckle images that are successively stepped in phase by $\pi/2$ and then used to calculate the phase of each object state.

For the method of the invention to work effectively, it is important that the data is sampled at the correct rate. If the phase is over-sampled as the pressure changes, than the phase will not have changed much and only noise will be integrated. If the phase is under-sampled, then wrapping transitions will be overlooked and errors will be introduced into the final image. In practice, for qualitative non-destructive; testing (NDT), it is usually acceptable if the largest defects contain unwrapping errors as they are still highly visible and this sampling rate often improves the detection rate of smaller, less evident defects.

The correct sampling rate that is the predetermined stress intervals has to be determined empirically for each generic type of component, because it is a function of the material type and structural properties. Once this has been established, the optimum sampling rate is achieved by capturing phase images at precise pressure increments. Ideally, this should ensure that the pressure increments chosen lead to linear phase increments.

The method of the present invention is particularly suitable for increasing signal-to-noise ratio in coherent optical inspection systems such as the laser shearography system illustrated in FIG. 1. The method of the invention has reduced tendencies to environmental instability which is a major factor that normally prevents exploitation of coherent optical systems. Additionally, the method of the present invention has a larger dynamic range than usual testing methods, is tolerant to air currents and produces images of significantly higher signal-to-noise ratio.

What is claimed is:

1. A method for increasing the signal-to-noise ratio in non-destructive testing or evaluation of a sample by a phase-stepped optical inspection system in which, correlated speckle images successively stepped in phase are generated and captured of a sample to be tested, by illuminating the sample, while in a static unstressed state, with coherent radiation, the sample is illuminated with coherent radiation, stressed incrementally at predetermined stress increments and correlated speckle images successively stepped in phase are generated of the incrementally stressed sample at the predetermined stress increments and captured, the phase-stepped speckle images of the unstressed sample and the phase-stepped speckle images of the incrementally stressed sample are used to calculate the phase before and after stressing and differenced to extract the incremental phase change, the magnitude and sign of each incremental phase change is inspected, and if the phase difference between successive measurements increases by more than $\pi$, $2\pi$ is subtracted from the measurement values, or if the phase difference between successive measurements decreased by more than $\pi$, $2\pi$ is added to the measurement value, and the phase at each point in each speckle, image is calculated with improved accurancy by summing the nearest neighbor phase differences in the image that are weighted by the square of their respective modulations, where the modulation is a measure of intensity variation with phase variation, and the result of this calculation is normalized by dividing by the sum of the modulations.

2. A method according to claim 1, in which the predetermined stress intervals employed are dependent on the material and structure of the sample.

3. A method according to claim 2, in which the phase differences are summed using a modulation filter in the form of a 3×3 convolution mask.

4. A method according claim 1, in which the optical inspection system utilized is an optical shearography system incorporating a shearing interferometer, and the modulation is a measure of intensity variation with phase variation in the shearing interferometer.

5. A method according to claim 1, in which the phase differences are summed using a modulation filter in the form of a 3×3 convolution mask.

6. A method according to claim 5, in which the optical inspection system utilized is an optical shearography system incorporating a shearing interferometer, and the modulation is a measure of intensity variation with phase variation in the shearing interferometer.

7. A method according to claim 2, in which the optical inspection system utilized is an optical shearography system incorporating a shearing interferometer, and the modulation is a measure of intensity variation with phase variation in the shearing interferometer.

* * * * *

UNITED STATES PATENT AND TRADEMARK OFFICE
CERTIFICATE OF CORRECTION

PATENT NO.    : 6,285,447 B1
DATED         : September 4, 2001
INVENTOR(S)   : Steve Carl Jamieson Parker et al.

It is certified that error appears in the above-identified patent and that said Letters Patent is hereby corrected as shown below:

<u>Column 4,</u>
Line 47, change "than" to -- then --.
Line 52, after "destructive" delete ";".

Signed and Sealed this

Seventh Day of May, 2002

Attest:

JAMES E. ROGAN
*Director of the United States Patent and Trademark Office*

*Attesting Officer*